US011833946B2

(12) United States Patent
Pinto et al.

(10) Patent No.: US 11,833,946 B2
(45) Date of Patent: Dec. 5, 2023

(54) VEHICLE SEAT

(71) Applicant: FAURECIA Sièges d'Automobile, Nanterre (FR)

(72) Inventors: Frédéric Pinto, Etampes (FR); Anne-Isabelle Mallet-Da Costa, Etrechy (FR); Joël Canteleux, Armenonville (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/673,964

(22) Filed: Feb. 17, 2022

(65) Prior Publication Data

US 2022/0258655 A1    Aug. 18, 2022

(51) Int. Cl.
*B60N 2/68*    (2006.01)
*B60N 2/64*    (2006.01)

(52) U.S. Cl.
CPC ............... *B60N 2/682* (2013.01); *B60N 2/64* (2013.01); *B60N 2/688* (2013.01)

(58) Field of Classification Search
CPC ......... B60N 2/888; B60N 2/894; B60N 2/688
See application file for complete search history.

(56) References Cited

U.S. PATENT DOCUMENTS

| | | | | |
|---|---|---|---|---|
| 5,447,360 A * | 9/1995 | Hewko | ................ | B60N 2/4249 297/216.13 |
| 5,452,941 A * | 9/1995 | Halse | .................... | B60N 2/688 297/483 |
| 5,645,316 A | 7/1997 | Aufrere | | |
| 5,658,048 A * | 8/1997 | Nemoto | ................... | B60R 22/20 297/410 |
| 5,984,419 A * | 11/1999 | Partington | ........... | B60N 2/5825 297/483 |
| 5,988,748 A * | 11/1999 | Morrison | ............... | B60N 2/688 297/440.22 |
| 6,082,823 A * | 7/2000 | Aumont | ............... | B60N 2/2222 297/483 |

(Continued)

FOREIGN PATENT DOCUMENTS

DE    000004316930 A1    10/1993
DE    102006018289 A1    10/2007
(Continued)

OTHER PUBLICATIONS

French Preliminary Search Report for French App. No. FR2101572 dated Oct. 20, 2021, 8 pages, No English Translation Available.

*Primary Examiner* — Timothy J Brindley
(74) *Attorney, Agent, or Firm* — BARNES & THORNBURG LLP

(57) ABSTRACT

A backrest of a vehicle seat, comprising a backrest frame, comprising a first lateral flank, a second lateral flank, an upper crossmember, a lower crossmember. The backrest further comprises a seat belt anchoring means support frame, comprising two upper tubes, each extending through a separate through-hole formed in the upper crossmember, so as to extend, at least partially, above the upper crossmember, a lower tube, positioned near the lower crossmember of the backrest frame, and fixed to at least one lateral flank of the backrest frame, at least one connecting tube connecting at least one upper tube to the lower tube.

16 Claims, 8 Drawing Sheets

(56) References Cited

U.S. PATENT DOCUMENTS

| | | | | |
|---|---|---|---|---|
| 6,523,892 | B1* | 2/2003 | Kage | B60N 2/888 |
| | | | | 297/216.13 |
| 6,817,672 | B2* | 11/2004 | Matsunuma | B60N 2/688 |
| | | | | 297/483 |
| 7,261,373 | B2* | 8/2007 | Tanaka | B60N 2/4221 |
| | | | | 297/483 |
| 9,340,135 | B2* | 5/2016 | Sakkinen | B60N 2/4235 |
| 10,189,386 | B2* | 1/2019 | Diaz Gonzalez | B60N 2/64 |
| 2010/0117410 | A1* | 5/2010 | Akaike | B60N 2/862 |
| | | | | 297/216.12 |
| 2010/0127540 | A1* | 5/2010 | Park | B60N 2/888 |
| | | | | 297/216.12 |
| 2010/0308629 | A1* | 12/2010 | Lee | B60N 2/888 |
| | | | | 297/216.12 |
| 2011/0109130 | A1* | 5/2011 | Nakaya | B60N 2/366 |
| | | | | 297/216.14 |
| 2011/0210592 | A1 | 9/2011 | Watanabe | |
| 2012/0193954 | A1* | 8/2012 | Sakkinen | B60N 2/4249 |
| | | | | 297/216.13 |
| 2013/0127215 | A1* | 5/2013 | Dumont | B60N 2/809 |
| | | | | 174/72 A |
| 2013/0187418 | A1* | 7/2013 | Watanabe | B60N 2/688 |
| | | | | 297/354.1 |
| 2014/0097663 | A1* | 4/2014 | Kroencke | B60R 22/20 |
| | | | | 242/615.3 |
| 2014/0327290 | A1* | 11/2014 | Matsumoto | B60R 22/26 |
| | | | | 297/452.18 |
| 2017/0113642 | A1* | 4/2017 | Inoue | B60N 2/686 |
| 2019/0092201 | A1* | 3/2019 | Hasegawa | B60N 2/2893 |

FOREIGN PATENT DOCUMENTS

| | | |
|---|---|---|
| DE | 102006033513 A1 | 1/2008 |
| DE | 102011004758 A1 | 5/2012 |
| DE | 112011103321 T5 | 7/2013 |
| FR | 2736312 A1 | 1/1997 |

* cited by examiner

VEHICLE SEAT

PRIORITY CLAIM

This application claims priority to French Patent Application No. FR2101572, filed Feb. 18, 2021, which is expressly incorporated by reference herein.

BACKGROUND

The present disclosure relates to a vehicle seat backrest, and in particular of a motor vehicle, particularly of the heavy vehicle type, to a vehicle seat comprising such a backrest, to a vehicle comprising such a seat, as well as to a method for manufacturing such a vehicle seat backrest.

The present disclosure further relates to the field of vehicle seats, and in particular of motor vehicles, particularly of the heavy vehicle type, meaning those having a Gross Vehicle Weight Rating (GVWR) of more than 3.5 metric tons.

SUMMARY

According to the present disclosure, a vehicle seat backrest comprises a backrest frame, comprising a first lateral flank, a second lateral flank, an upper crossmember, and a lower crossmember.

In illustrative embodiments, the upper crossmember and the lower crossmember interconnect the first lateral flank and the second lateral flank substantially in the transverse direction of the backrest, such that the backrest frame has a substantially rectangular shape.

In illustrative embodiments, the backrest further comprises a seat belt anchoring means support frame, configured to receive at least one anchoring means of a seat belt, and in particular an upper anchoring means, comprising:
two upper tubes, substantially parallel to each other, each extending through a separate through-hole formed in the upper crossmember of the backrest frame, so as to extend, at least partially, above the upper crossmember, in the vertical direction of the backrest,
a lower tube, extending substantially in the transverse direction of the backrest, positioned near the lower crossmember of the backrest frame, and fixed to at least one lateral flank of the backrest frame, and
at least one connecting tube connecting at least one upper tube to the lower tube.

In illustrative embodiments, the support frame further comprises an upper seat belt anchoring means comprising a loop, through which a seat belt can slide, connected on the one hand to an upper tube of the support frame and on the other hand to the backrest frame, and in particular to the first lateral flank, preferably to an outer wall of the first lateral flank, or to the second lateral flank, preferably to an outer wall of the second lateral flank, near the upper crossmember.

In illustrative embodiments, the upper anchoring means further comprises a support tube having a first longitudinal end and a second longitudinal end, the loop of the upper anchoring means being fixed to the support tube, the first longitudinal end of the support tube being fixed to the upper tube and the second longitudinal end of the support tube being fixed to the backrest frame.

In illustrative embodiments, the second longitudinal end of the support tube is fixed to the lateral flank among the first or second lateral flanks which is located closest, in the transverse direction of the backrest, to the upper tube to which the first longitudinal end of the support tube is fixed, the second longitudinal end of the support tube being in particular fixed to an outer wall of the lateral flank.

In illustrative embodiments, the two upper tubes are interconnected by a cross brace, extending substantially in the transverse direction of the backrest and positioned above the upper crossmember of the backrest frame in the vertical direction of the backrest, so as to substantially form a U.

In illustrative embodiments, the lower tube has a first longitudinal end, a first mounting plate, in particular configured to receive a first lower lateral anchoring means of a seat belt, being fixed to the lower tube at the first longitudinal end, the first mounting plate being fixed to the first lateral flank, preferably to an inner wall of the first lateral flank, or to the second lateral flank, preferably to an inner wall of the second lateral flank, near the lower crossmember.

In illustrative embodiments, the lower tube has a second longitudinal end, a second mounting plate, in particular configured to receive a second lower lateral anchoring means of a seat belt, being fixed to the lower tube at the second longitudinal end, the second mounting plate being fixed to the second lateral flank, preferably to an inner wall of the second lateral flank, respectively to the first lateral flank, preferably to an inner wall of the first lateral flank, substantially facing the first mounting plate in the transverse direction of the backrest and near the lower crossmember.

In illustrative embodiments, the connecting tube has a first longitudinal end and a second longitudinal end, the first longitudinal end of the connecting tube being connected to an upper tube and the second longitudinal end of the connecting tube being connected to the lower tube, preferably near its first longitudinal end or its second longitudinal end.

In illustrative embodiments, according to a first alternative, the first longitudinal end of the connecting tube is connected to the upper tube furthest from the first longitudinal end of the lower tube and the second longitudinal end of the connecting tube is connected to the first longitudinal end of the lower tube, and according to a second alternative, the first longitudinal end of the connecting tube is connected to the upper tube furthest from the second longitudinal end of the lower tube and the second longitudinal end of the connecting tube is connected to the second longitudinal end of the lower tube, the connecting tube having at least one portion that is inclined relative to the upper tube and to the lower tube.

In illustrative embodiments, the connecting tube comprises:
an upper portion extending substantially in the transverse direction of the backrest near the upper crossmember of the backrest frame, and to which the two upper tubes are directly fixed,
a first lateral portion connected to the lower tube near its first longitudinal end,
a second lateral portion connected to the lower tube near its second longitudinal end, the upper portion interconnecting the first lateral portion and the second lateral portion.

In illustrative embodiments, the first lateral portion of the connecting tube is substantially parallel to the second lateral portion of the connecting tube, such that the upper portion, the first lateral portion, and the second lateral portion substantially form a U.

In illustrative embodiments, a vehicle seat comprises a backrest according to one of the embodiments of the present disclosure.

The present disclosure also relates to a motor vehicle, and in particular a motor vehicle of the heavy vehicle type, comprising a seat according to one of the embodiments of the present disclosure.

Finally, the present disclosure relates to a method for manufacturing a vehicle seat backrest according to one of the embodiments of the present disclosure, comprising:

/a/ providing a backrest frame;
/b/ providing a support frame; and
/c/ assembling the backrest frame and the support frame.

In illustrative embodiments, during /b/, the upper tubes and/or the lower tube and/or the connecting tube can be provided not connected to one another, the upper tubes and/or the lower tube and/or the connecting tube being assembled separately to the backrest frame before being assembled together.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

For the most part, the drawings and the following description contain elements that are certain in nature. Therefore they can serve not only to provide a better understanding of the present disclosure, but can also contribute to its definition where appropriate.

Throughout this application, the spatial directions are defined as follows:

the longitudinal direction X of the seat corresponds to the direction in which the seat can slide relative to the floor of the vehicle along slides, when the seat includes slides as means of anchoring to the floor of the vehicle, received on the seating portion frame of the seat; as shown in the embodiments of FIGS. 1 to 5B, the longitudinal direction X of the backrest is advantageously coincident with the longitudinal direction X of the seat receiving the backrest, the vertical direction Z of the seat corresponds to the direction perpendicular to the plane of the floor of the vehicle to which the seat is fixed, also perpendicular to the longitudinal direction X of the seat defined above; as shown in the embodiments of FIGS. 1 to 5B, the vertical direction Z of the backrest is advantageously coincident with the longitudinal direction Z of the seat receiving the backrest, the transverse direction Y of the seat is the direction perpendicular to the longitudinal direction and to the vertical direction; as shown in the embodiments of FIGS. 1 to 5B, the transverse direction Y of the backrest is advantageously coincident with the transverse direction Y of the receiving seat the file.

An axis is defined as a straight line in a defined direction. For example, a transverse axis is an axis along the transverse direction.

Also, front (in front of) and rear (behind) are understood according to the longitudinal direction of the seat (respectively of the backrest), with an orientation from the rear edge of the seating portion frame, where the seat backrest is generally hinged, towards the front edge of the seating portion frame.

Similarly, upper (top) and lower (bottom) are understood according to the vertical direction of the seat (respectively of the backrest), with an orientation from the means of anchoring to the vehicle floor, and in particular the slides, towards the seating portion frame.

Finally, throughout this application, substantially longitudinal, transverse, or vertical is understood to mean an orientation relative to the longitudinal direction, the vertical direction, or the transverse direction, at an angle of less than 30° which may advantageously be zero.

Similarly, substantially parallel is understood to mean an orientation relative to a given element at an angle of less than 30° which may advantageously be zero.

Figure 1:
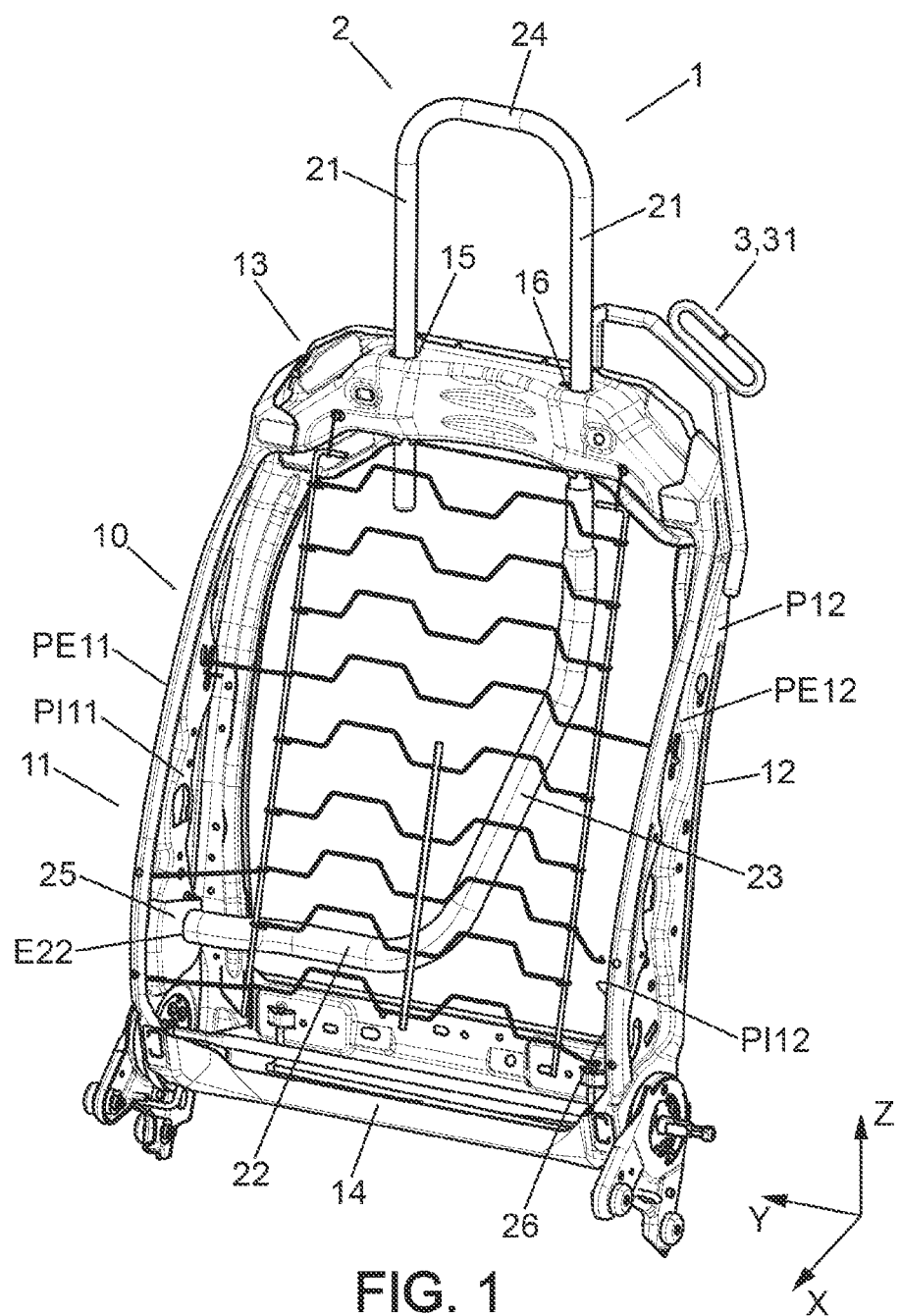
FIG. 1 shows a perspective view of a vehicle seat backrest according to a first embodiment of the present disclosure.
Figure 4A:
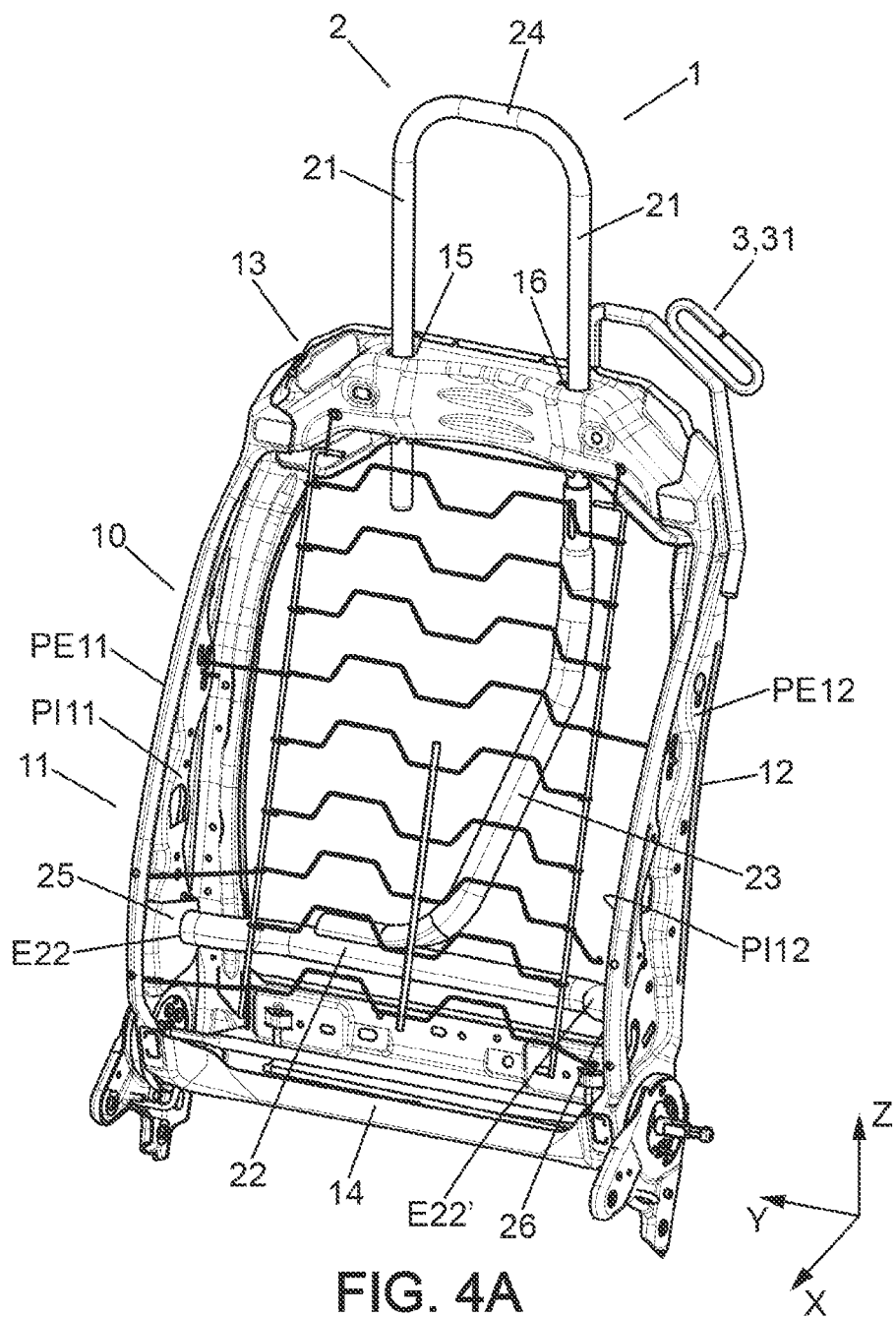
FIG. 4A shows a perspective view of a vehicle seat backrest according to a second embodiment of the present disclosure.
Figure 5A:
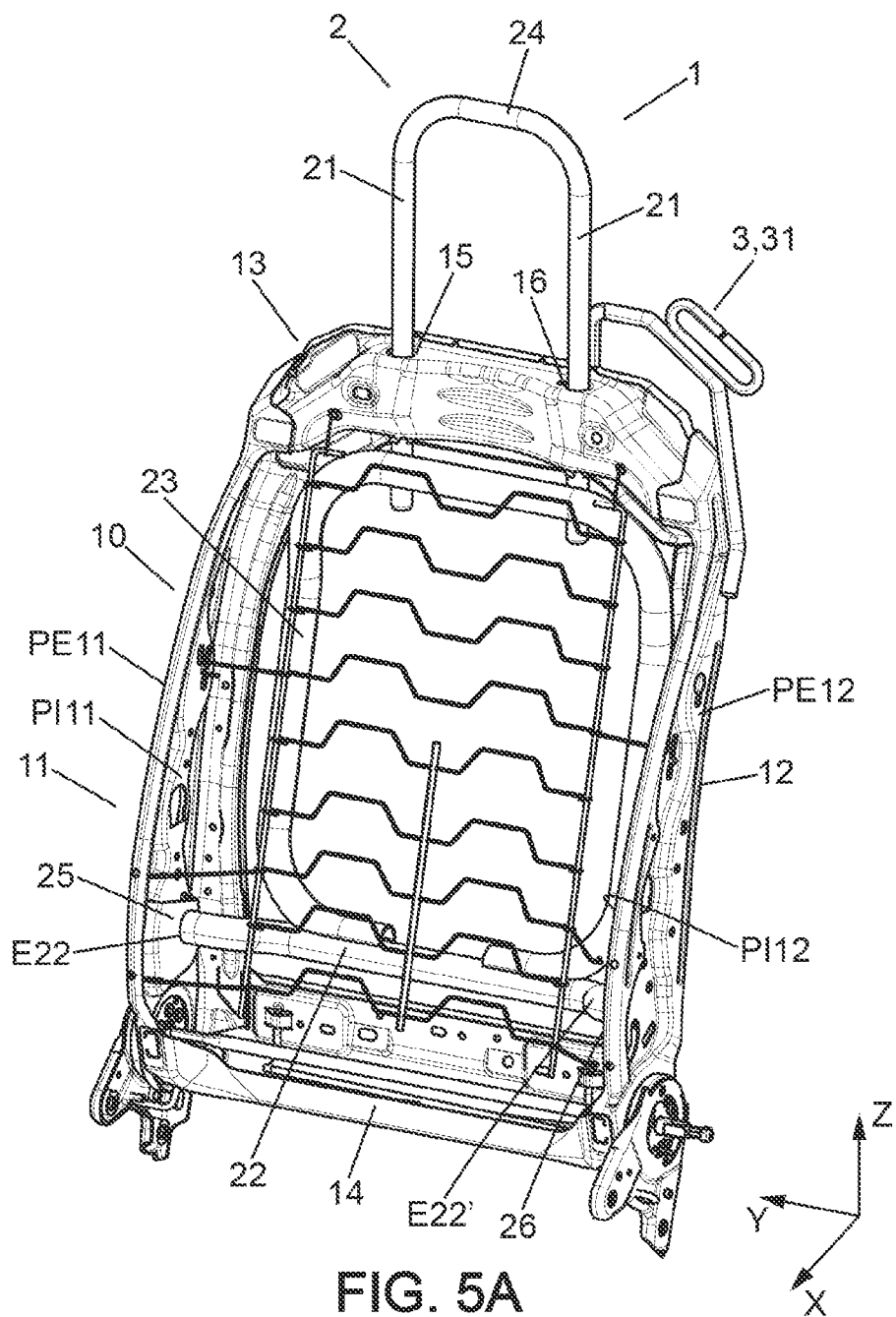
FIG. 5A shows a perspective view of a vehicle seat backrest according to a third embodiment of the present disclosure.

As can be seen in FIGS. 1, 4A, and 5A, the present disclosure relates to a backrest 1 of a vehicle seat S comprising a backrest frame 10, including: a first lateral flank 11, a second lateral flank 12, an upper crossmember 13, and a lower crossmember 14.

According to the present disclosure, the upper crossmember 13 and the lower crossmember 14 interconnect the first lateral flank 11 and the second lateral flank 12 substantially in the transverse direction Y of the backrest 1, such that the backrest frame 10 has a substantially rectangular shape.

According to the present disclosure, the backrest 1 further comprises a seat belt anchoring means support frame 2, configured to receive at least one anchoring means 3 of a seat belt, and in particular an upper anchoring means 31, comprising:

two upper tubes 21, substantially parallel to each other, each extending through a separate through-hole 15, 16 formed in the upper crossmember 13 of the backrest frame 10, so as to extend, at least partially, above the upper crossmember 13, in the vertical direction Z of the backrest 1, a lower tube 22, extending substantially in the transverse direction Y of the backrest 1, positioned near the lower crossmember 14 of the backrest frame 10, and fixed to at least one lateral flank 11, 12 of the backrest frame 10, at least one connecting tube 23 connecting at least one upper tube 21 to the lower tube 22.

Thus, with the backrest 1 according to the present disclosure, it is possible to create a backrest 1 for a vehicle seat S according to the ABTS standard, as described above, from an already existing backrest frame 10 or according to a comparative design, and in particular a backrest frame 10 intended for a vehicle seat according to the LBTS standard, as described above, which significantly reduces the production cost of the backrest 1.

Indeed, at least one anchoring means 3 of a seat belt, and in particular an upper anchoring means 31, can be fixed to the support frame 2 of the backrest 1 according to the present disclosure and therefore to the backrest 1 according to the present disclosure, so as to create a vehicle seat S according to the ABTS standard, and without modifying the design of the backrest frame 10, advantageously initially intended for a seat according to the ABTS standard.

Also, the through-holes 15, 16 of the backrest frame 10 through which the upper tubes 21 extend may be already existing through-holes, for example intended to receive guide or support tubes of a headrest of a seat according to the LBTS standard, and therefore allow the use of a backrest frame of an existing vehicle seat backrest or one according to a comparative design, and without requiring any modification of the backrest frame.

According to the findings of the inventor, a seat belt fixed to the support frame 2 of the backrest 1 according to the present disclosure, via the at least one anchoring means 3, is able to resist tearing according to the ECE R14 standard, and in particular if the backrest 1 is intended for a seat S of a heavy vehicle of category N3 or even N2.

Thus, with the backrest 1 of the present disclosure, it is not necessary to provide a new production line in order to produce a seat backrest according to the ABTS standard, because the production line of a seat backrest according to the LBTS standard can also be used, as the backrest frame 10 can be the same for a seat according to the ABTS standard or according to the LBTS standard, which also makes it possible to reduce the production cost of the backrest 1 of the present disclosure, because there is no need to compensate for the creation of a new production line or the redesign of the backrest frame 10.

Advantageously, and in order to facilitate manipulation of the backrests 1 according to the present disclosure, and therefore of the seats S receiving them, the backrest frame 10 and the support frame 2 can be manipulated separately before they are assembled to produce the backrest 1 according to the present disclosure.

In addition, as the manufacture of the backrest 1 according to the present disclosure may consist simply of assembly and fixing of the support frame 2 to the backrest frame 10, it can be carried out at a preparer, and not necessarily by the manufacturer of the backrest frame 10, in particular in a factory, and without requiring significant know-how or resources.

Advantageously, the upper tubes 21, the lower tube 22 and the at least one connecting tube 23 may each be made of a metal material, and in particular from metal tubes shaped according to the desired shape and dimensions, and may be assembled together by welding, and in particular according to the MAG technique ("Metal Active Gas", a technique defined by standard EN ISO 4063-2009).

Figure 4B:
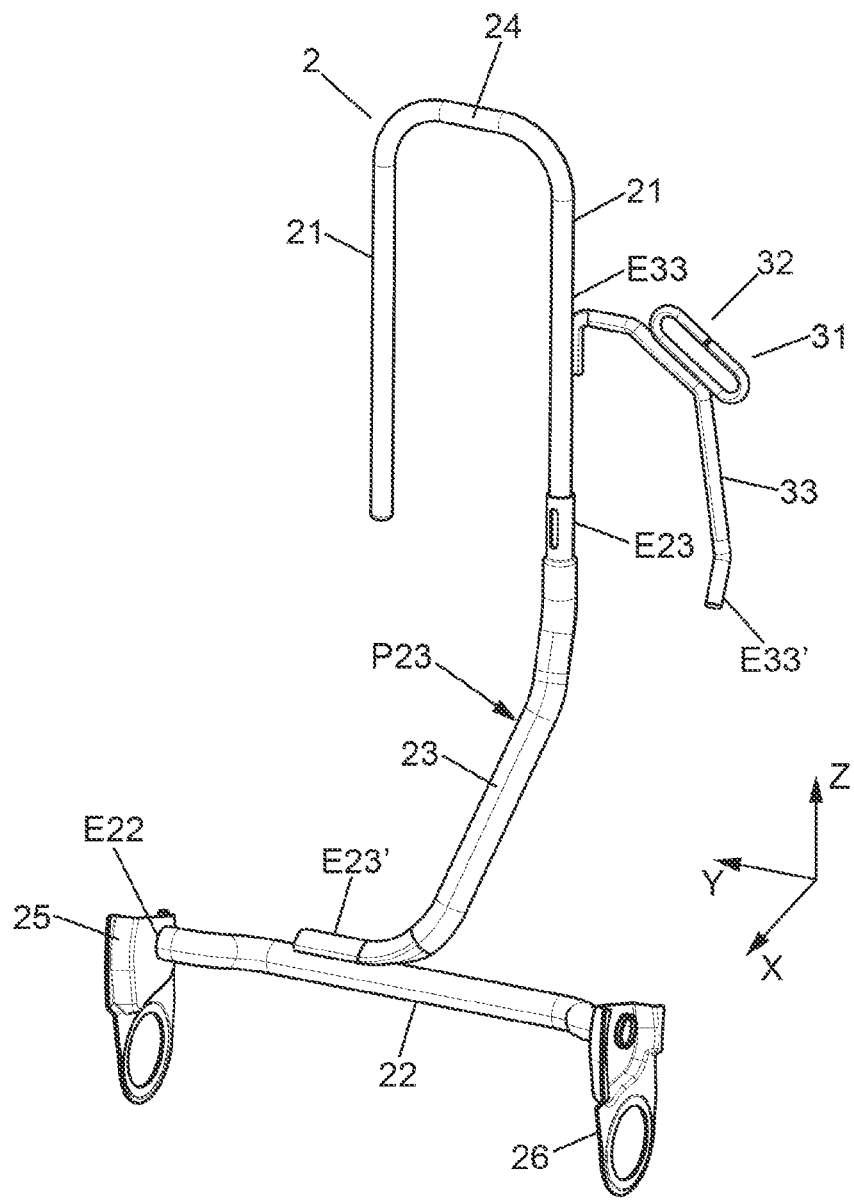
FIG. 4B shows a perspective view of the support frame of the vehicle seat backrest of FIG. 4A.

As can be seen in FIGS. 1, 4A, and 4B, the connecting tube 23 of the support frame 2 may advantageously be positioned between the upper crossmember 13 and the lower crossmember 14 of the backrest frame 10 in the vertical direction Z of the backrest 1.

According to one embodiment, and as can be seen in FIGS. 1 to 5B, the support frame 2 further comprises an upper seat belt anchoring means 31 comprising a loop 32, through which a seat belt can slide, connected on the one hand to an upper tube 21 of the support frame 2 and on the other hand to the backrest frame 10, and in particular to the first lateral flank 11, preferably to an outer wall PE11 of the first lateral flank 11, or to the second lateral flank 12, preferably to an outer wall PE12 of the second lateral flank 12, near the upper crossmember 13.

Thus, the forces received by the upper anchoring means 31, in particular in the event of tearing of the seat belt whose strap slides through the loop 32 of the upper anchoring means 31, can be taken up simultaneously by the backrest frame 10 and by the support frame 2, and so as to satisfy the constraints imposed by the standards in effect, and in particular the ECE R14 standard, in particular when the backrest 1 is part of a seat intended to be received in a heavy vehicle according to the N2 standard or according to the N3 standard.

The loop 32 may advantageously be created in a simplified manner from a rod or metal tube shaped into the desired shape and dimensions.

Figure 3:
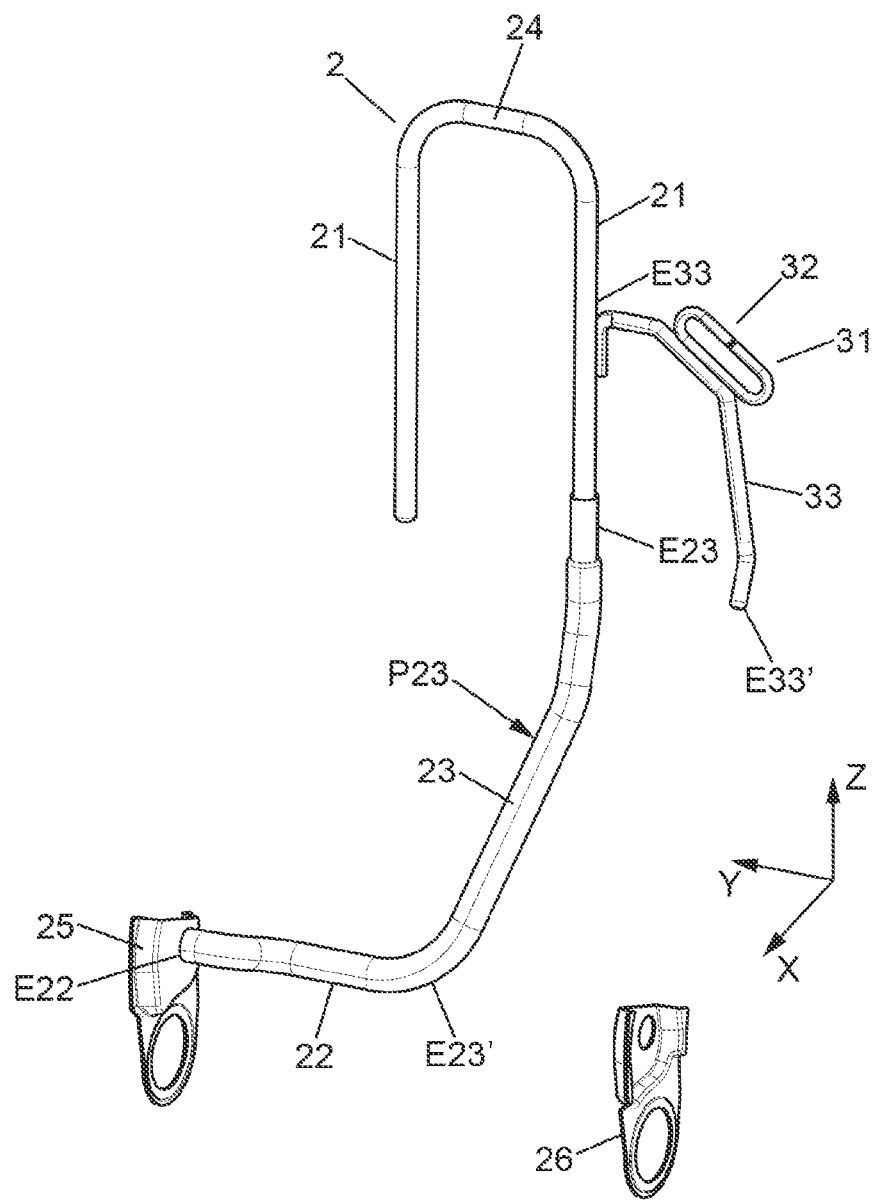
FIG. 3 shows a perspective view of the support frame of the vehicle seat backrest of FIG. 1.
Figure 5B:
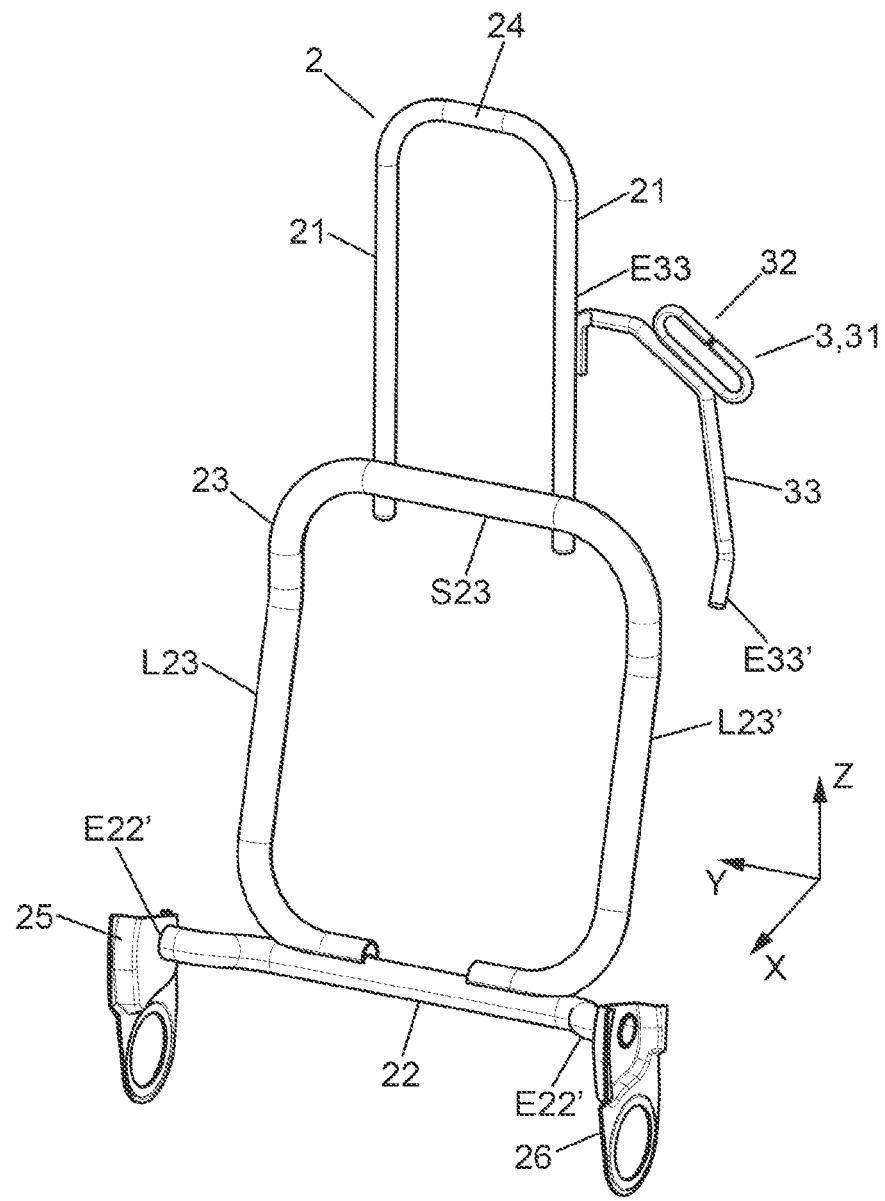
FIG. 5B shows a perspective view of the support frame of the vehicle seat backrest of FIG. 5A.

According to one embodiment, and as can be seen more particularly in FIGS. 3, 4B, and 5B, the upper anchoring means 31 further comprises a support tube 33 having a first longitudinal end E33 and a second longitudinal end E33', the loop 32 of the upper anchoring means 31 being fixed to the support tube 33, the first longitudinal end E33 of the support tube 33 being fixed to the upper tube 21 and the second longitudinal end E33' of the support tube 33 being fixed to the backrest frame 10.

The first anchoring means 31 thus has a simplified design. The support tube 33 may be created from a metal tube or rod shaped into the desired shape and dimensions. The support tube 33 and the loop 32 may advantageously be assembled by welding.

Advantageously, and in order to minimize the dimensions of the support tube 33 and facilitate its production, the second longitudinal end E33' of the support tube 33 may be fixed to the lateral flank among the first 11 or the second 12 lateral flank that is closest, in the transverse direction Y of the backrest 1, to the upper tube 21 to which the first longitudinal end E33 of the support tube 33 is fixed, the second longitudinal end E33' of the support tube 33 being in particular fixed to an outer wall PE11, PE12 of the lateral flank 11, 12, as can be seen in FIGS. 3, 4B, and 5B.

According to one embodiment, and as can be seen more particularly in FIGS. 3, 4B, and 5B, the two upper tubes 21 are interconnected by a cross brace 24 extending substantially in the transverse direction Y of the backrest 1 and positioned above the upper crossmember 13 of the backrest frame 10 in the vertical direction Z of the backrest 1, so as to form substantially a U.

The two upper tubes 21 and the cross brace 24 may advantageously form a support for a headrest of the seat S receiving the backrest 1 according to the present disclosure.

The upper tubes 21 and the cross brace 24 may advantageously be connected at one, respectively each, of their respective longitudinal ends.

Advantageously, and in order to facilitate the manufacture of the support frame 2 of the backrest 1 according to the present disclosure, the two upper tubes 21 and the cross brace 24 may be created as one piece, for example from a tube or rod shaped to the desired shape and dimensions.

According to one embodiment, the lower tube 22 has a first longitudinal end E22, a first mounting plate 25, in particular configured to receive a first lower lateral anchoring means (not shown) of a seat belt, being fixed to the lower tube 22 at the first longitudinal end E22, the first mounting plate 25 being fixed to the first lateral flank 11, preferably to an inner wall PI11 of the first lateral flank 11, or to the second lateral flank 12, preferably to an inner wall PI12 of the second lateral flank 12, near the lower crossmember 14, as can be seen more particularly in FIGS. 1, 4A, and 5A.

Thus, due to this advantageous arrangement of the present disclosure, in the case where the first mounting plate 25 receives a first lower lateral anchoring means of a seat belt, the forces received by the first lower lateral anchoring means of a seat belt attached to the backrest 1 according to the present disclosure are taken up simultaneously by the support frame 2 and the backrest frame 10 of the backrest 1, and so as to satisfy the constraints imposed by the standards in effect, and in particular the ECE R14 standard, in particular when the backrest 1 is part of a seat intended to be received in a heavy vehicle according to the N2 standard or according to the N3 standard.

Advantageously, the first lower lateral anchoring means may comprise a guide, in particular in the form of a loop, through which the strap of the seat belt can slide, or a belt buckle fixed to one end of the seat belt strap and intended to be removably received in a receiving means for the belt buckle.

Figure 2:
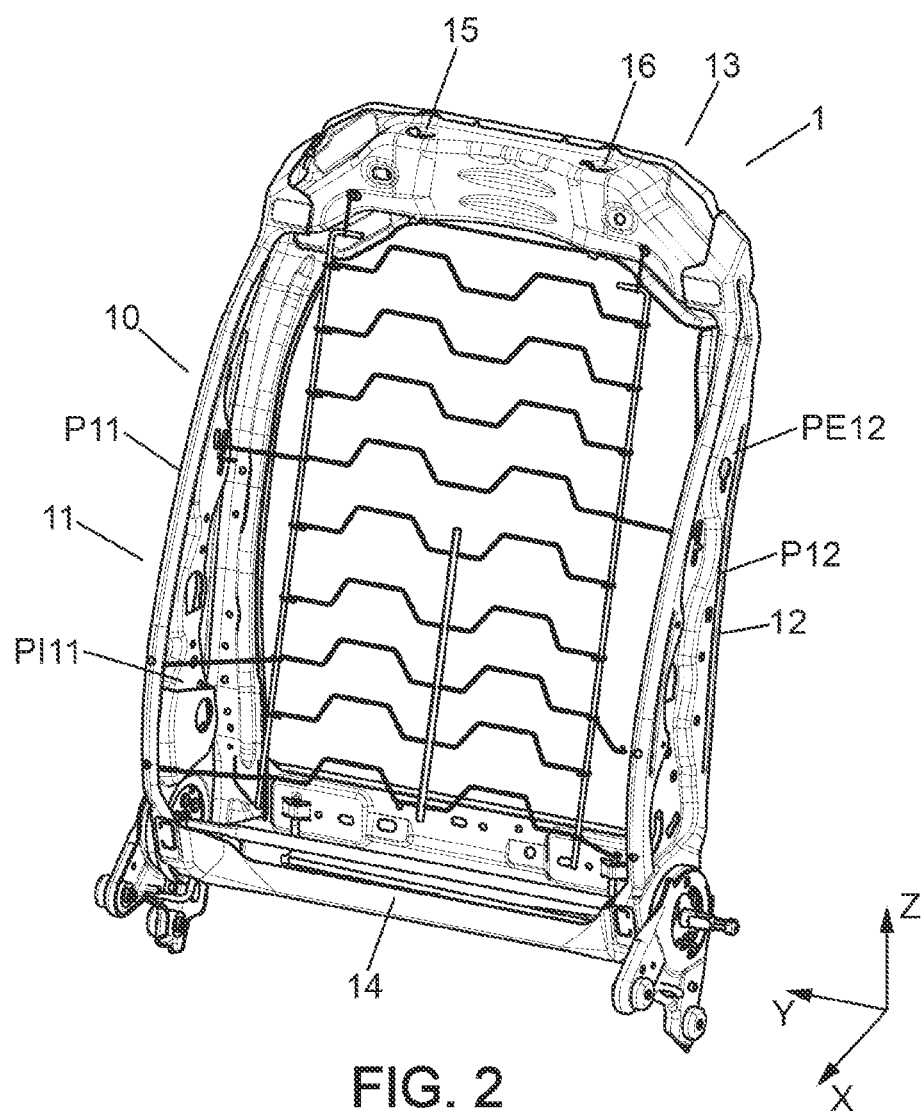
FIG. 2 shows a perspective view of the backrest frame of the vehicle seat backrest of FIG. 1, of FIG. 4A, and of FIG. 5A.

As can be seen in FIGS. 2 and 3, the backrest 1 may also comprise a second mounting plate 26, in particular configured to receive a second lower lateral anchoring means of a seat belt (not shown), and in particular fixed to the second lateral flank 12, preferably to an inner wall PI12 of the second lateral flank 12, respectively to the first lateral flank 11, preferably to an inner wall PI11 of the first lateral flank 11, advantageously near the lower crossmember 14, and preferably substantially facing the first mounting plate 25 in the transverse direction Y of the backrest 1. The second mounting plate 26 may advantageously be separate from the lower tube 22 of the support frame 2.

Thus, in the case where the second mounting plate 26 receives a second lower lateral anchoring means of a seat belt, the forces received by the second lower lateral anchoring means of a seat belt attached to the backrest 1 according to the present disclosure are taken up by the backrest frame 10 of the backrest 1, and so as to satisfy the constraints imposed by the standards in effect, and in particular the ECE R14 standard, in particular when the backrest 1 is part of a seat intended to be received in a heavy vehicle according to the N2 standard or according to the N3 standard.

Also, the second lower lateral anchoring means may comprise a guide, in particular in the form of a loop, through which the strap of the seat belt can slide, or a belt buckle fixed to one end of the seat belt strap and intended to be removably received in a receiving means for the belt buckle.

According to one embodiment, and as can be seen more particularly in FIGS. 4A and 4B, the lower tube 22 has a second longitudinal end E22', a second mounting plate 26, in particular configured to receive a second lower lateral anchoring means of a seat belt, being fixed to the lower tube 22 at the second longitudinal end E22', the second mounting plate 26 being fixed to the second lateral flank, preferably to an inner wall PI12 of the second lateral flank 12, respectively to the first lateral flank 11, preferably to an inner wall PI11 of the first lateral flank 11, substantially facing the first mounting plate 25 in the transverse direction Y of the backrest 1 and near the lower crossmember 14.

Thus, due to this advantageous arrangement of the present disclosure, in the case where the second mounting plate 26 receives a second lower lateral anchoring means of a seat belt, the forces received by the second lower lateral anchoring means of a seat belt attached to the backrest 1 according to the present disclosure are also taken up simultaneously by the support frame 2 and the backrest frame 10 of the backrest 1, and so as to satisfy the constraints imposed by the standards in effect, and in particular the ECE R14 standard, in particular when the backrest 1 is part of a seat intended to be received in a heavy vehicle according to the N2 standard or according to the N3 standard.

Advantageously, the second lower lateral anchoring means may comprise a guide, in particular in the form of a loop, through which the strap of the seat belt can slide, or a belt buckle fixed to one end of the seat belt strap and intended to be removably received in a receiving means for the belt buckle.

According to one embodiment, and as can be seen more particularly in FIGS. 2, 3, 4A, and 4B, the connecting tube 23 has a first longitudinal end E23 and a second longitudinal end E23', the first longitudinal end E23 of the connecting tube 23 being connected to an upper tube 21 and the second longitudinal end E23' of the connecting tube 23 being connected to the lower tube 22, preferably near its first longitudinal end E22 or its second longitudinal end E22'.

This advantageous arrangement of the present disclosure makes it possible to minimize the size of the connecting tube 23 and therefore of the support frame 2, and therefore its production cost, facilitate its manufacture, and ensure sufficient mechanical strength and rigidity of the support frame 2 to withstand the forces received by the anchoring means 3 of a seat belt fixed to the support frame 2, and in particular so as to satisfy the constraints imposed by the standards in effect, and in particular the ECE R14 standard, in particular when the backrest 1 is part of a seat intended to be received in a heavy vehicle according to the N2 standard or according to the N3 standard.

Advantageously, and in order to facilitate the manufacture of the support frame 2 of the backrest 1 according to the present disclosure, the connecting tube 23 may be created as one piece from a metal tube shaped according to the desired shape and dimensions.

According to one embodiment, and as can be seen more particularly in FIGS. 3 and 4B:

according to a first alternative, the first longitudinal end E23 of the connecting tube 23 is connected to the upper tube 21 furthest from the first longitudinal end E22 of the lower tube 22, and the second longitudinal end E23' of the connecting tube 23 is connected to the first longitudinal end E22 of the lower tube 22, according to a second alternative, the first longitudinal end E23 of the connecting tube 23 is connected to the upper tube 21 furthest from the second longitudinal end E22' of the lower tube 22, and the second longitudinal end E23' of the connecting tube 23 is connected to the second longitudinal end E22 of the lower tube 22.

According to such an embodiment, the connecting tube 23 may have at least one portion P23 that is inclined relative to the upper tube 21 and to the lower tube 22.

The first alternative is suitable for the two embodiments described above, i.e. only a first mounting plate 25 is connected to the lower tube 22 or a first 25 and a second 26 mounting plate are connected to the lower tube 22, while the second alternative is suitable for the second embodiment described above, i.e. a first 25 and a second 26 mounting plate are connected to the lower tube 22.

This advantageous arrangement of the present disclosure makes it possible to increase the mechanical strength and rigidity of the support frame 2 of the backrest 1 according to the present disclosure.

Advantageously, the portion P23 of the support tube 23 may be inclined relative to the upper tube 21 by an angle of between 20° and 70°, preferably between 30° and 60°.

According to one embodiment, and as can be seen more particularly in FIGS. 5A and 5B, the connecting tube 23 comprises:
- an upper portion S23 extending substantially in the transverse direction Y of the backrest 1 near the upper crossmember 13 of the backrest frame 10, and to which the two upper tubes 21 are directly fixed,
- a first lateral portion L23 connected to the lower tube 22 near its first longitudinal end E22,
- a second lateral portion L23' connected to the lower tube 22 near its second longitudinal end E22',
- and wherein the upper portion S23 interconnects the first lateral portion L23 and the second lateral portion L23'.

This advantageous arrangement of the present disclosure makes it possible to increase the mechanical strength and rigidity of the support frame 2 of the backrest 1 according to the present disclosure, while retaining a reduced size and production cost, as well as a simplicity of manufacture.

Advantageously, and in order to facilitate the manufacture of the support frame 2 of the backrest 1 according to the present disclosure, the connecting tube 23 may also be created as one piece from a tube or a metal rod shaped to the desired shape and dimensions.

According to one embodiment, the first lateral portion L23 of the connecting tube 23 is substantially parallel to the second lateral portion L23' of the connecting tube 23, so that the upper portion S23, the first lateral portion L23, and the second lateral portion L23' substantially form a U.

Thus, as can be seen more particularly in FIGS. 5A and 5B, the assembly formed by the lower tube 22 and the support tube 23 assembled together has a substantially rectangular shape, and such that the mechanical strength and rigidity of the support frame 2 of the backrest 1 according to the present disclosure is increased, while retaining a reduced footprint and production cost, as well as a simplicity of manufacture.

Figure 6:
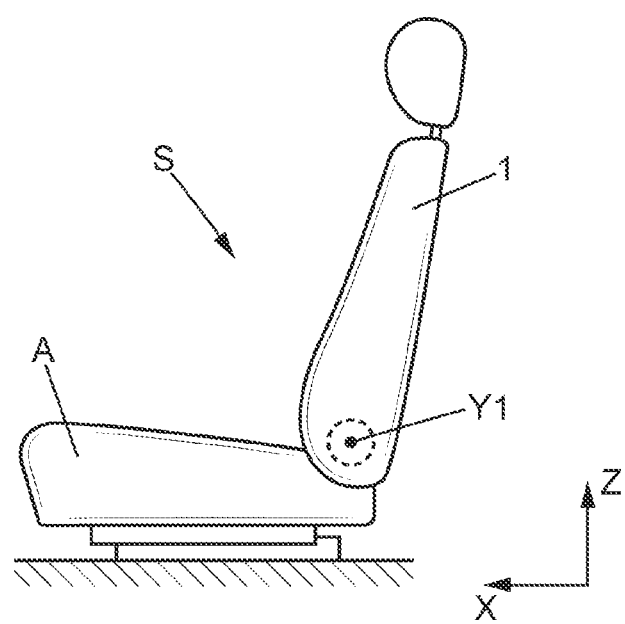
FIG. 6 shows a schematic side view of a vehicle seat comprising a backrest according to an embodiment of the present disclosure.

The present disclosure also relates to a vehicle seat S comprising a backrest 1 according to one of the embodiments described above, as can be seen in FIG. 6.

The seat S may also include a seating portion A to which the backrest 1 is fixed, and in particular by being hinged thereto along a transverse axis Y1 of the backrest 1, positioned near the lower crossmember 14 of the backrest frame 10.

All of the arrangements described above concerning a vehicle seat S comprising a backrest 1 according to the present disclosure apply to the seat S according to the present disclosure.

In particular, as explained above, such a vehicle seat S may advantageously correspond to the ABTS standard, and be produced from an already existing backrest frame 10 or according to a comparative design, and in particular a backrest frame 10 intended for a vehicle seat according to the LBTS standard.

Also, as explained above, a seat belt fixed to the support frame 2 of the backrest 1 of the seat S according to the present disclosure, via at least one anchoring means 3 of a seat belt, and in particular an upper anchoring means 31, is able to withstand tearing according to the ECE R14 standard, and in particular if the backrest 1 is provided for a seat S of a heavy vehicle of category N3 or even N2.

Thus, advantageously, the seat S according to the present disclosure may be a seat for a motor vehicle of the heavy vehicle type, for example a heavy vehicle of category N2, i.e. with a GVWR of between 3.5 metric tons and 12 metric tons, or even a heavy vehicle of category N3, i.e. with a GVWR of more than 12 metric tons.

The present disclosure also relates to a motor vehicle, and in particular a motor vehicle of the heavy vehicle type, i.e. with a GVWR of more than 3.5 metric tons, comprising a vehicle seat S according to one of the embodiments described above.

All of the arrangements described above concerning a vehicle equipped with a vehicle seat S comprising a backrest 1 according to the present disclosure apply to the motor vehicle according to the present disclosure.

The present disclosure lastly relates to a method for manufacturing a backrest 1 of a vehicle seat S according to one of the embodiments described above, comprising:
- /a/ providing a backrest frame 10;
- /b/ providing a support frame 2;
- /c/ assembling the backrest frame 10 and the support frame 2.

All of the provisions described above concerning the production of a backrest 1 according to the present disclosure apply to the method for manufacturing a backrest 1 according to the present disclosure.

In particular, as explained above, such a method proves to be simple to implement and does not necessarily require providing a new production line for producing a seat backrest according to the ABTS standard, because the production line for a seat backrest according to the LBTS standard can also be used, which makes it possible in particular to reduce the production cost of the method.

Also, as explained above, such a manufacturing method can be carried out at a preparer, and not necessarily by the manufacturer of the backrest frame 10 and therefore in a factory, and without requiring significant know-how or resources.

According to one embodiment of the method, during /b/, the upper tubes 21 and/or the lower tube 22 and/or the connecting tube 23 may be supplied not connected to one another, the upper tubes 21 and/or the lower tube 22 and/or the connecting tube 23 being assembled separately to the backrest frame 10 before being assembled together.

For example, according to one particular embodiment, during /b/ the lower tube 22, possibly provided with the first 25 and/or the second 26 mounting plate, may be supplied assembled with the connecting tube 23. Then, during /c/, the lower tube 22 and the connecting tube 23 are fixed to the backrest frame 10, possibly via the first 25 and/or the second 26 mounting plate.

Also, the upper tubes may for example during /b/ be supplied not assembled to the connecting tube 23, but possibly assembled to each other by means of the cross brace 24. They can then, during /c/, each be slid respectively through one of the separate through-holes 15, 16, before being fixed to the connecting tube 23.

Naturally, other embodiments are conceivable to those skilled in the art without departing from the scope of the present disclosure defined by the claims below.

The present disclosure relates to a vehicle seat backrest, and in particular of a motor vehicle, particularly of the heavy vehicle type, to a vehicle seat comprising such a backrest, to a vehicle comprising such a seat, as well as to a method for manufacturing such a vehicle seat backrest.

The present disclosure relates to the field of vehicle seats, and in particular of motor vehicles, particularly of the heavy vehicle type, meaning those having a Gross Vehicle Weight Rating (GVWR) of more than 3.5 metric tons.

A vehicle generally comprises at least one seat intended to accommodate a driver or a passenger of the vehicle, hereinafter referred to as a "user". The seat may be designed to accommodate a single person or several people seated side by side, and may be arranged in the front or the rear of the vehicle.

Thus, within the meaning of the present disclosure, the term "seat" according to the present disclosure denotes both a front seat of the vehicle and a rear seat of the vehicle. Similarly, the present disclosure can be implemented for seats intended for any type of vehicle and in particular for motor vehicles, and in particular of the heavy vehicle type, i.e. those having a GVWR of more than 3.5 metric tons.

A vehicle seat may comprise a seating portion frame, configured to be connected to the floor of a vehicle, in particular with means for anchoring to the floor of the vehicle, generally in the form of two slides arranged one on either side of the lower frame, configured to be fixed to the floor of the vehicle and to allow the seat to slide relative to the floor of the vehicle in the longitudinal direction of the seat.

The seating portion frame may have a front edge and a rear edge, the seating portion frame being configured to accommodate at least one user.

The seat generally comprises at least one backrest, hinged to the seating portion frame at its rear edge so as to pivot about a transverse axis of the seat.

Such a backrest may comprise a backrest frame comprising a first lateral flank and a second lateral flank which are interconnected, substantially along the transverse direction of the seat, by an upper crossmember and a lower crossmember, so as to have a substantially rectangular shape.

A vehicle seat is also generally equipped with a seat belt, designed to firmly hold a seat occupant thereon in the event of an impact or a sudden braking of the vehicle receiving the seat.

Such a seat belt generally comprises a strap configured to be connected to the vehicle receiving the seat at a plurality of anchoring points, by means of anchoring means, so as to ensure the retention of the occupant in the seat.

Generally, the seat belt is attached to the vehicle receiving the seat by three separate anchoring means: an upper anchoring means, a first lateral lower anchoring means, and a second lateral lower anchoring means. Once the strap of the belt has been received in the anchoring elements, a part of the strap called the lap portion of the strap, extending between the first and the second lateral lower anchoring elements, is provided for exerting support near the pelvis of the seat occupant, while another portion of the strap called the chest portion of the strap, extending between one among the first or second lower lateral anchoring elements and the upper anchoring element, comes to exert support on the trunk of the seat occupant.

The upper anchoring means may advantageously comprise a guide, for example in the form of a loop, through which the strap can slide, while one among the first and second lower lateral anchoring means may also comprise a guide through which the strap can slide while the other may comprise a seat belt buckle, attached to one end of the seat belt strap, the seat belt buckle being intended to be removably received in a receiving means for the seat belt buckle.

Depending on the type of vehicle in which the seat is intended to be fixed, for example light or heavy vehicle, and/or depending on the constraints in terms of tear strength of the anchoring means, for example according to safety standards in effect, the anchoring means may be fixed at different locations on the seat and/or on the vehicle receiving the seat, and in particular its frame.

Thus, according to the ABTS standard ("All Belts To Seat") in force in particular on the European continent, the three anchoring means of the strap are fixed directly to the vehicle seat, and in particular to the seating portion frame and/or the backrest frame of the seat.

According to the LBTS standard ("Low Belt To Seat") in force in particular in North America, the first and the second lower lateral anchoring means are fixed directly to the frame of the vehicle seat, and in particular to the seating portion frame and/or to the backrest frame of the seat, while the upper anchoring means is fixed to the vehicle frame.

For heavy vehicles of the "N3" category (according to the French Highway Code), i.e. heavy vehicles whose GVWR is strictly greater than 12 metric tons, and according to the ECE R14 standard, the strap and the anchoring means of the seat belt must be able to resist tearing when subjected to a tensile stress of 350 daN.

For heavy vehicles of the "N2" category (according to the French Highway Code), i.e. heavy vehicles whose GVWR is strictly greater than 3.5 metric tons and less than or equal to 12 metric tons, and according to the ECE R14 standard, the strap and the anchoring means of the seat belt must be able to resist tearing when subjected to a tensile stress of 750 daN.

Thus, for a manufacturer of vehicle seats, and in particular of motor vehicle seats, particularly of the heavy vehicle type, depending on the final location of use of the seat, for example in Europe or in North America, the seat must be designed to meet the various standards in effect, and in particular those concerning the position of the anchoring means of its seat belt or the tear strength of these anchoring means.

It is generally provided that the different types of vehicle seat are assembled on separate production lines or that the design of the seat is completely reworked in order to adapt it to its final location of use, particularly in terms of the standards to be met, which has several disadvantages: the need for sufficient space to install the different separate production lines, the increase in amortization time for each production line or for the redesign of the seat and therefore the increase in the production cost of vehicle seats, the need to manipulate the vehicle seats, and in particular their backrest frame, in their assembled state, etc.

The present disclosure overcomes the shortcomings of some vehicle seats, and in particular their backrest, by proposing a vehicle seat backrest which can be more easily produced according to different standards, and in particular according to the ABTS, LBTS standards described above, and at a reduced production cost.

The present disclosure thus relates to a vehicle seat backrest comprising a backrest frame, comprising: a first lateral flank, a second lateral flank, an upper crossmember, and a lower crossmember.

The upper crossmember and the lower crossmember interconnect the first lateral flank and the second lateral flank substantially in the transverse direction of the backrest, such that the backrest frame has a substantially rectangular shape.

The backrest further comprises a seat belt anchoring means support frame, configured to receive at least one anchoring means of a seat belt, and in particular an upper anchoring means, comprising:
  two upper tubes, substantially parallel to each other, each extending through a separate through-hole formed in the upper crossmember of the backrest frame, so as to extend, at least partially, above the upper crossmember, in the vertical direction of the backrest,
  a lower tube, extending substantially in the transverse direction of the backrest, positioned near the lower crossmember of the backrest frame, and fixed to at least one lateral flank of the backrest frame, and at least one connecting tube connecting at least one upper tube to the lower tube.

The features set forth in the following paragraphs may optionally be implemented. They may be implemented independently of one another or in combination with one another:

the support frame further comprises an upper seat belt anchoring means comprising a loop, through which a seat belt can slide, connected on the one hand to an upper tube of the support frame and on the other hand to the backrest frame, and in particular to the first lateral flank, preferably to an outer wall of the first lateral flank, or to the second lateral flank, preferably to an outer wall of the second lateral flank, near the upper crossmember;

the upper anchoring means further comprises a support tube having a first longitudinal end and a second longitudinal end, the loop of the upper anchoring means being fixed to the support tube, the first longitudinal end of the support tube being fixed to the upper tube and the second longitudinal end of the support tube being fixed to the backrest frame;

the second longitudinal end of the support tube is fixed to the lateral flank among the first or second lateral flanks which is located closest, in the transverse direction of the backrest, to the upper tube to which the first longitudinal end of the support tube is fixed, the second longitudinal end of the support tube being in particular fixed to an outer wall of the lateral flank;

the two upper tubes are interconnected by a cross brace, extending substantially in the transverse direction of the backrest and positioned above the upper crossmember of the backrest frame in the vertical direction of the backrest, so as to substantially form a U;

the lower tube has a first longitudinal end, a first mounting plate, in particular configured to receive a first lower lateral anchoring means of a seat belt, being fixed to the lower tube at the first longitudinal end, the first mounting plate being fixed to the first lateral flank, preferably to an inner wall of the first lateral flank, or to the second lateral flank, preferably to an inner wall of the second lateral flank, near the lower crossmember;

the lower tube has a second longitudinal end, a second mounting plate, in particular configured to receive a second lower lateral anchoring means of a seat belt, being fixed to the lower tube at the second longitudinal end, the second mounting plate being fixed to the second lateral flank, preferably to an inner wall of the second lateral flank, respectively to the first lateral flank, preferably to an inner wall of the first lateral flank, substantially facing the first mounting plate in the transverse direction of the backrest and near the lower crossmember;

the connecting tube has a first longitudinal end and a second longitudinal end, the first longitudinal end of the connecting tube being connected to an upper tube and the second longitudinal end of the connecting tube being connected to the lower tube, preferably near its first longitudinal end or its second longitudinal end;

according to a first alternative, the first longitudinal end of the connecting tube is connected to the upper tube furthest from the first longitudinal end of the lower tube and the second longitudinal end of the connecting tube is connected to the first longitudinal end of the lower tube, and according to a second alternative, the first longitudinal end of the connecting tube is connected to the upper tube furthest from the second longitudinal end of the lower tube and the second longitudinal end of the connecting tube is connected to the second longitudinal end of the lower tube, the connecting tube having at least one portion that is inclined relative to the upper tube and to the lower tube;

the connecting tube comprises:

an upper portion extending substantially in the transverse direction of the backrest near the upper crossmember of the backrest frame, and to which the two upper tubes are directly fixed, a first lateral portion connected to the lower tube near its first longitudinal end, a second lateral portion connected to the lower tube near its second longitudinal end, the upper portion interconnecting the first lateral portion and the second lateral portion;

The first lateral portion of the connecting tube is substantially parallel to the second lateral portion of the connecting tube, such that the upper portion, the first lateral portion, and the second lateral portion substantially form a U.

The present disclosure also relates to a vehicle seat comprising a backrest according to one of the embodiments of the present disclosure.

The present disclosure also relates to a motor vehicle, and in particular a motor vehicle of the heavy vehicle type, comprising a seat according to one of the embodiments of the present disclosure.

Finally, the present disclosure relates to a method for manufacturing a vehicle seat backrest according to one of the embodiments of the present disclosure, comprising:

/a/ providing a backrest frame;
/b/ providing a support frame;
/c/ assembling the backrest frame and the support frame.

According to one embodiment of the method, during /b/, the upper tubes and/or the lower tube and/or the connecting tube can be provided not connected to one another, the upper tubes and/or the lower tube and/or the connecting tube being assembled separately to the backrest frame before being assembled together.

The features set forth in the following paragraphs may optionally be implemented. They may be implemented independently of each other or in combination with one another.

The invention claimed is:

1. A backrest of a vehicle seat, comprising a backrest frame, comprising:

a first lateral flank,
a second lateral flank,
an upper crossmember,
a lower crossmember,
wherein the upper crossmember and the lower crossmember interconnect the first lateral flank and the second lateral flank substantially in the transverse direction of the backrest, such that the backrest frame has a substantially rectangular shape, the backrest further comprising a seat belt anchoring means support frame, configured to receive at least one anchoring means of a seat belt, and in particular an upper anchoring means of a seat belt, the seat belt anchoring means support frame comprising:

two upper tubes, substantially parallel to each other, each extending through a separate through-hole formed in the upper crossmember of the backrest frame, so as to extend, at least partially, above the upper crossmember, in the vertical direction of the backrest, a lower tube, extending substantially in the transverse direction of the backrest, positioned near the lower crossmember of the backrest frame, and fixed to at least one lateral flank of the backrest frame, and at least one connecting tube connecting at least one upper tube to the lower tube.

2. The backrest of claim 1, wherein the support frame further comprises the upper anchoring means of a seat belt comprising a loop, through which a seat belt can slide, connected on the one hand to an upper tube of the seat belt anchoring means support frame and on the other hand to the backrest frame, and in particular to the first lateral flank, preferably to an outer wall of the first lateral flank, or to the second lateral flank, preferably to an outer wall of the second lateral flank, near the upper crossmember.

3. The backrest of claim 2, wherein the upper anchoring means of a seat belt further comprises a support tube having a first longitudinal end and a second longitudinal end, the loop of the upper anchoring means being fixed to the support tube, the first longitudinal end of the support tube being fixed to the upper tube and the second longitudinal end of the support tube being fixed to the backrest frame.

4. The backrest of claim 3, wherein the second longitudinal end of the support tube is fixed to the lateral flank among the first or second lateral flanks which is located closest, in the transverse direction of the backrest, to the upper tube to which the first longitudinal end of the support tube is fixed, the second longitudinal end of the support tube being in particular fixed to an outer wall of the lateral flank.

5. The backrest of claim 1, wherein the two upper tubes are interconnected by a cross brace, extending substantially in the transverse direction of the backrest and positioned above the upper crossmember of the backrest frame in the vertical direction of the backrest, so as to substantially form a U.

6. The backrest (1) of claim 1, wherein the lower tube has a first longitudinal end, a first mounting plate, in particular configured to receive a first lower lateral anchoring means of a seat belt, being fixed to the lower tube at the first longitudinal end, the first mounting plate being fixed to the first lateral flank, preferably to an inner wall of the first lateral flank, or to the second lateral flank, preferably to an inner wall of the second lateral flank, near the lower crossmember.

7. The backrest of claim 6, wherein the lower tube has a second longitudinal end, a second mounting plate, in particular configured to receive a second lower lateral anchoring means of a seat belt, being fixed to the lower tube at the second longitudinal end, the second mounting plate being fixed to the second lateral flank, preferably to an inner wall of the second lateral flank, respectively to the first lateral flank, preferably to an inner wall of the first lateral flank, substantially facing the first mounting plate in the transverse direction of the backrest and near the lower crossmember.

8. The backrest of claim 6, wherein the connecting tube has a first longitudinal end and a second longitudinal end, the first longitudinal end of the connecting tube being connected to an upper tube and the second longitudinal end of the connecting tube being connected to the lower tube, preferably near its first longitudinal end or its second longitudinal end.

9. The backrest of claim 8, wherein the first longitudinal end of the connecting tube is connected to the upper tube furthest from the first longitudinal end of the lower tube, and the second longitudinal end of the connecting tube is connected to the first longitudinal end of the lower tube.

10. The backrest of claim 8, wherein the first longitudinal end of the connecting tube is connected to the upper tube furthest from the second longitudinal end of the lower tube, and the second end longitudinal of the connecting tube is connected to the second longitudinal end of the lower tube, the connecting tube having at least one portion that is inclined relative to the upper tube and to the lower tube.

11. The backrest of claim 7, wherein the connecting tube comprises:

an upper portion extending substantially in the transverse direction of the backrest near the upper crossmember of the backrest frame, and to which the two upper tubes are directly fixed, a first lateral portion connected to the lower tube near its first longitudinal end, a second lateral portion connected to the lower tube near its second longitudinal end, and wherein the upper portion interconnects the first lateral portion and the second lateral portion.

12. The backrest of claim 11, wherein the first lateral portion of the connecting tube is substantially parallel to the second lateral portion of the connecting tube, such that the upper portion, the first lateral portion, and the second lateral portion substantially form a U.

13. A vehicle seat comprising the backrest of claim 1.

14. A motor vehicle, and in particular a motor vehicle of the heavy vehicle type, comprising to the seat of claim 13.

15. A method for manufacturing the backrest of claim 1, comprising:

/a/ providing the backrest frame;

/b/ providing the support frame; and

/c/ assembling the backrest frame and the support frame.

16. The method of claim 15, wherein, during/b/, the upper tubes and/or the lower tube and/or the connecting tube can be provided not connected to one another, the upper tubes and/or the lower tube and/or the connecting tube being assembled separately to the backrest frame before being assembled together.

* * * * *